United States Patent
Sutherland et al.

(10) Patent No.: US 6,250,665 B1
(45) Date of Patent: Jun. 26, 2001

(54) RETAINER STRUCTURE FOR AN INFLATABLE VEHICLE OCCUPANT PROTECTION DEVICE

(75) Inventors: Daniel R. Sutherland, Eastpointe; Matthew G. Bombard, Washington; Paul A. Bowers, Ray, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/211,411

(22) Filed: Dec. 15, 1998

(51) Int. Cl.[7] .................................................. B60R 21/16
(52) U.S. Cl. ..................... 280/728.2; 280/743.1; 411/168
(58) Field of Search ........................... 280/728.2, 731, 280/732, 743.1; 411/301, 168

(56) References Cited

U.S. PATENT DOCUMENTS

| | | | |
|---|---|---|---|
| 3,255,795 | * 6/1966 | Ginsburg | 411/301 |
| 3,726,330 | * 4/1973 | Adler | 411/168 |
| 4,988,119 | 1/1991 | Hartmeyer . | |
| 5,064,218 | 11/1991 | Hartmeyer . | |
| 5,152,549 | * 10/1992 | Aird | 280/728.2 |
| 5,176,400 | 1/1993 | McGuire et al. . | |
| 5,295,706 | 3/1994 | Morita . | |
| 5,308,107 | 5/1994 | Watanabe et al. . | |
| 5,368,327 | * 11/1994 | Shiraki et al. | 280/728.2 |
| 5,518,266 | * 5/1996 | O'Docherty et al. | 280/728.2 |
| 5,727,810 | 3/1998 | Elqadah et al. . | |
| 5,848,801 | * 12/1998 | Hirt | 280/731 |
| 5,947,509 | * 9/1999 | Ricks et al. | 280/728.2 |

OTHER PUBLICATIONS

U.S. Patent application Ser. No. 08/923,621, filed Sep. 4, 1997, entitled "Air Bag Module."
U.S. Patent application Ser. No. 08/974,985, filed Nov. 20, 1997, entitled "Vehicle Occupant Protection Apparatus."
U.S. Patent application Ser. No. 08/144,136, filed Aug. 31, 1998, entitled "Fastening Structure for Interconnecting Parts of a Vehicle Occupant Protection Apparatus."

* cited by examiner

Primary Examiner—Robert P. Olszewski
Assistant Examiner—Lynda Jasmin
(74) Attorney, Agent, or Firm—Tarolli, Sundheim, Covell, Tummino & Szabo L.L.P.

(57) ABSTRACT

An apparatus (10) includes a retainer ring configured to overlie an edge portion (52) of an inflatable vehicle occupant protection device (14) adjacent to an opening (53) defined by the edge portion (52). A mounting stud projects from the retainer ring. In a one embodiment, the mounting stud (64) has a central axis (71) and a free end (72) spaced from the retainer ring (54) along the axis (71). The peripheral size and shape of the mounting stud (64) are uniform fully between the retainer ring (54) and the free end (72). The mounting stud (64) further has an axially extending bore (85) configured to receive a screw-threaded fastener (66). In an additional embodiment, the mounting stud (124) is receivable through an aperture (76) in a reaction structure (28). The mounting stud (124) and a key (140) are configured to snap together into an interlocked condition in which the key (140) blocks withdrawal of the mounting stud (124) from the aperture (76) in the reaction structure (28).

9 Claims, 3 Drawing Sheets

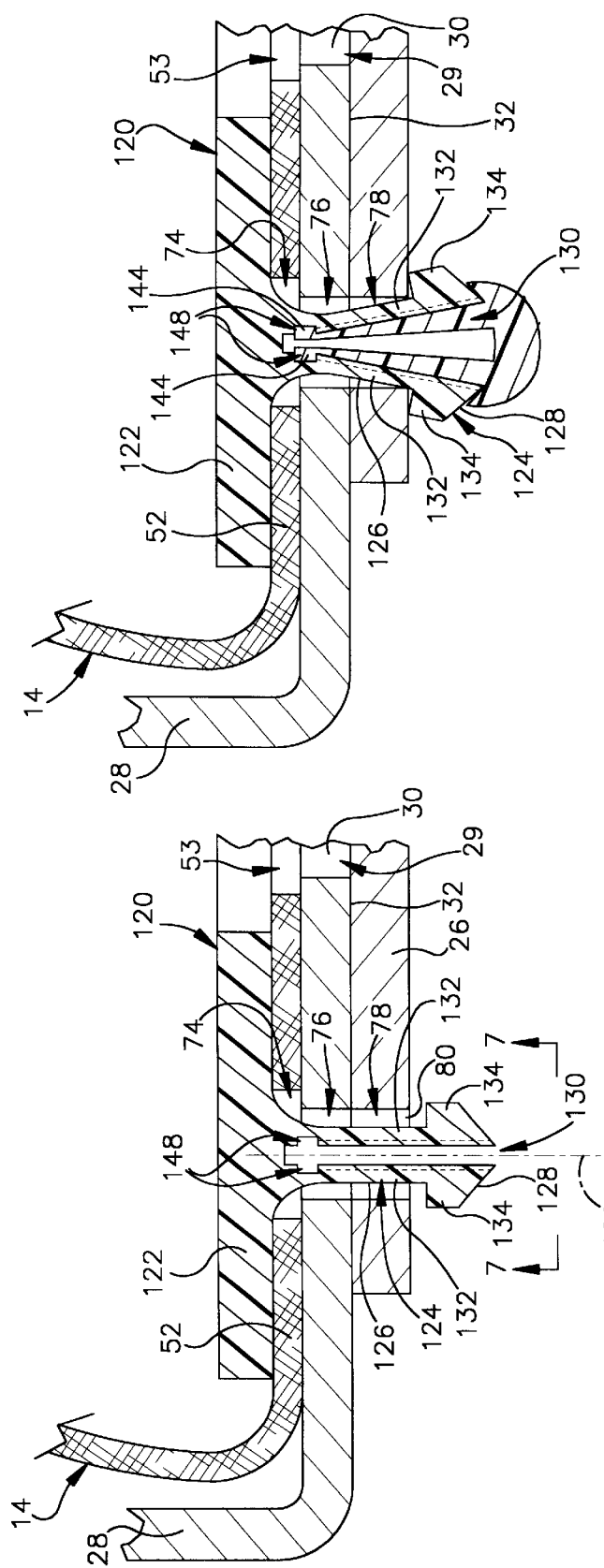
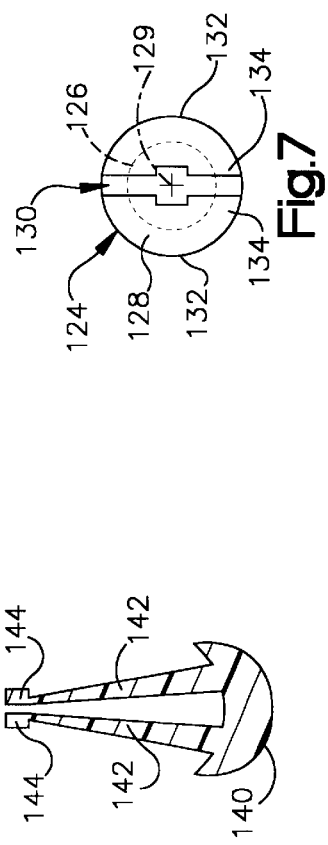

RETAINER STRUCTURE FOR AN INFLATABLE VEHICLE OCCUPANT PROTECTION DEVICE

FIELD OF THE INVENTION

The present invention relates to an apparatus for protecting an occupant of a vehicle, and particularly relates to an apparatus including an inflatable vehicle occupant protection device.

BACKGROUND OF THE INVENTION

An inflatable vehicle occupant protection device, such as an air bag, is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment to help restrain movement of an occupant of the vehicle.

An air bag and an inflator are typically assembled together as parts of an air bag module which is separate from the crash sensor. The air bag module is located in the vehicle adjacent to the vehicle occupant compartment. For example, a driver's side air bag module may be located on the vehicle steering column. A passenger side air bag module may be located in the vehicle instrument panel.

In addition to the air bag and the inflator, an air bag module typically includes a reaction structure, a retainer, and a cover. The reaction structure supports the inflator. The reaction structure may thus comprise, for example, a reaction canister which contains the inflator, or a reaction plate upon which the inflator is mounted. The reaction structure may alternatively comprise a structural portion of a vehicle part, such as a seat, door, or instrument panel, upon which the inflator is mounted. The retainer typically comprises a circular or rectangular ring surrounding the inflator. An edge portion of the air bag also surrounds the inflator. The edge portion of the air bag is clamped between the retainer and the reaction structure.

The cover includes a deployment door which extends over the air bag to conceal the air bag and the other parts of the module from view in the vehicle occupant compartment. When the inflation fluid emitted from the inflator begins to inflate the air bag, it moves the air bag outward against the deployment door on the cover. The cover ruptures under the force of the inflation fluid pressure acting on the air bag. The deployment door is then moved pivotally out of the path of the air bag as the inflation fluid continues to inflate the air bag outward from the cover and into the vehicle occupant compartment. In addition to rupturing the cover, the force of the inflation fluid pressure tends to pull the clamped edge portion of the air bag in a direction outward from between the retainer and the reaction structure.

SUMMARY OF THE INVENTION

The present invention comprises a retainer ring and a mounting stud projecting from the retainer ring. The retainer ring is configured to overlie an edge portion of an inflatable vehicle occupant protection device adjacent to an opening defined by the edge portion of the protection device. In a first embodiment of the invention, the mounting stud has a central axis and a free end spaced from the retainer ring along the axis. The peripheral size and shape of the mounting stud are uniform fully between the retainer ring and the free end of the mounting stud. The mounting stud further has an axially extending bore configured to receive a screw-threaded fastener.

In accordance with a principal feature of the present invention, the first embodiment includes an inflatable vehicle occupant protection device, an inflator, and a reaction structure. The inflator and the reaction structure comprise rigid clampable parts. The mounting stud projects from the retainer ring fully through an aperture in the protection device. The mounting stud further projects partially through an aperture in one of the rigid clampable parts.

The first embodiment further includes a fastener. A shaft portion of the fastener is received in the bore in the mounting stud. A head portion of the fastener is tightened against the rigid clampable part through which the mounting stud projects only partially.

An additional embodiment of the invention includes a differently configured mounting stud. In that embodiment, the mounting stud is receivable through an aperture in a reaction structure. The mounting stud and a key are configured to snap together into an interlocked condition in which the key blocks withdrawal of the mounting stud from the aperture in the reaction structure.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 5 is a partly exploded view of parts of a third embodiment of the invention;

FIG. 6 is a view showing the parts of FIG. 5 in an interconnected relationship; and FIG. 7 is a view taken on line 7—7 of FIG. 5.

DESCRIPTION OF PREFERRED EMBODIMENTS

Figure 1:
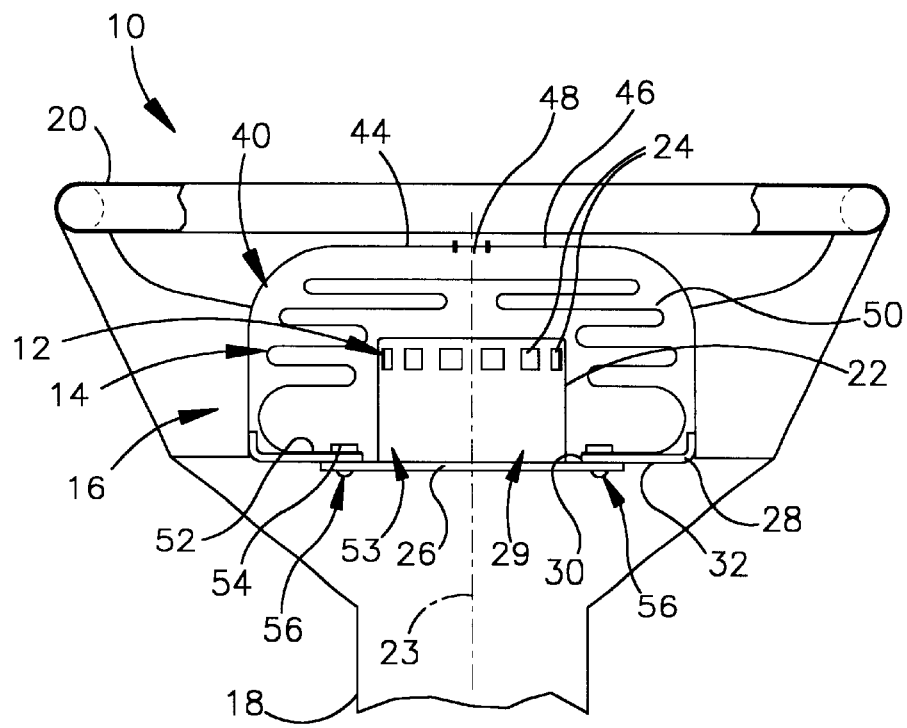
FIG. 1 is a schematic view of a vehicle occupant protection apparatus comprising a first embodiment of the invention.
Figure 2:
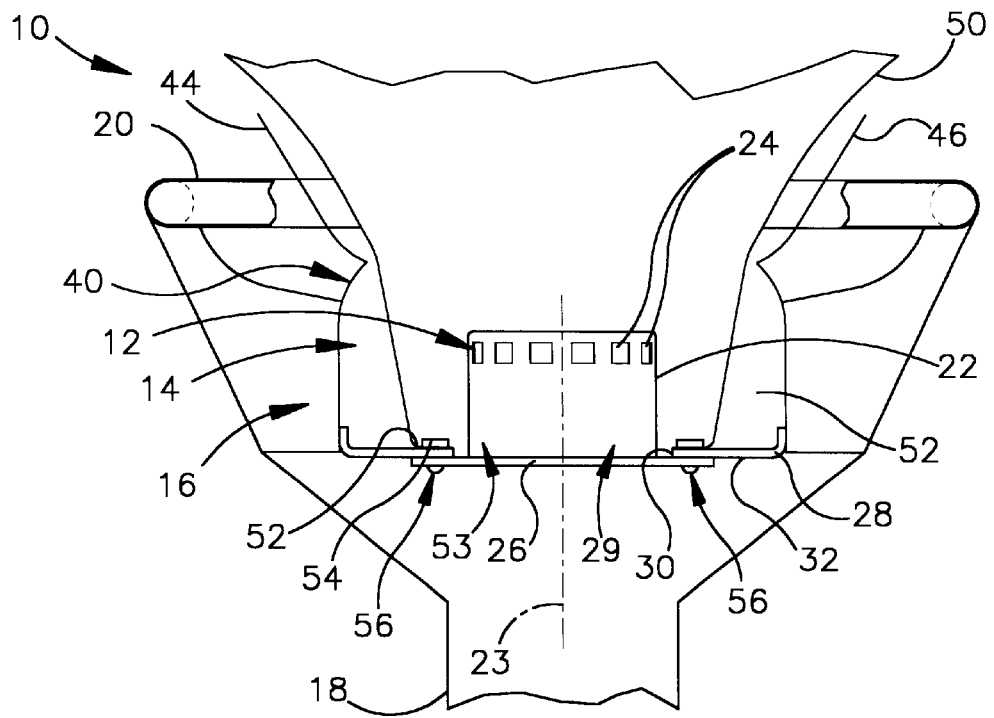
FIG. 2 is a view showing the apparatus of FIG. 1 in an actuated condition.

A vehicle occupant protection apparatus 10 comprising a first embodiment of the present invention is shown schematically in FIGS. 1 and 2. The apparatus 10 includes an inflator 12 and a particular type of inflatable vehicle occupant protection device 14 which is commonly referred to as an air bag. In the first embodiment of the invention, the air bag 14 and the inflator 12 are parts of an air bag module 16 which is mounted on a vehicle steering column 18 near the center of the steering wheel 20. The air bag 14 is inflatable from a folded, stored condition, as shown in FIG. 1, to an unfolded, deployed condition, as shown partially in FIG. 2. When the air bag 14 is being inflated, it moves toward the driver of the vehicle. The air bag 14 then helps to restrain the driver from moving toward the steering wheel 20 under the influence of vehicle crash forces.

The air bag 14 is constructed of panels of a known air bag material. Such materials include woven materials and plastic films. The panels of air bag material are interconnected along seams formed by stitches, ultrasonic welds, adhesives, heat staking, or the like, depending on the particular air bag material of which the panels are formed. Preferably, the air bag 14 is constructed of panels formed of a nylon fabric which is coated with silicone. Any suitable arrangement of folds can be used to place the air bag 14 in the stored condition in which it is shown schematically in FIG. 1. Moreover, other inflatable vehicle occupant protection devices that can be used in accordance with the invention include, for example, inflatable knee bolsters, inflatable head liners or side curtains, and knee bolsters operated by inflatable air bags.

The inflator 12 contains a source of inflation fluid for inflating the air bag 14. As known in the art, the inflator 12 may contain an ignitable gas generating material which, when ignited, generates a large volume of inflation gas. The inflator 12 may alternatively contain a stored quantity of pressurized inflation fluid, or a combination of pressurized inflation fluid and ignitable material for heating the inflation fluid. As shown schematically in FIGS. 1 and 2, the inflator 12 in the first embodiment has a cylindrical metal housing 22 with a central axis 23. A circumferentially extending array of inflation fluid outlet openings 24 is located near the upper end of the housing 22. A rigid annular flange 26 projects radially outward from the lower end of the housing 22.

A reaction plate 28 supports the inflator 12 on the steering column 18. The housing 22 projects axially upward, as viewed in the drawings, through a circular opening 29 defined by an annular inner edge surface 30 of the reaction plate 28. The flange 26 projects radially outward from the opening 29 and is received against a lower side surface 32 of the reaction plate 28. The reaction plate 28 is a rigid part which is preferably formed of metal, and may further have any structure that is suitable for supporting the inflator 12 on the steering column 18. Accordingly, the reaction plate 28 may define the hub of the steering wheel 20, or may be mounted on another part (not shown) which defines the hub of the steering wheel 20, as known in the art.

A plastic cover 40 encloses the air bag 14 and the inflator 12. The cover 40 includes first and second deployment door panels 44 and 46 which extend over the air bag 14. The deployment door panels 44 and 46 are held in closed positions, as shown in FIG. 1, by a rupturable section 48 of the cover 40. The structure of the cover 40, including the number and arrangement of deployment door panels and rupturable sections, can vary from the example shown schematically in the drawings.

The inflator 12 is actuated in a known manner upon the occurrence of a crash having at least a specified threshold level of severity for which inflation of the air bag 14 is desired to help restrain the driver. Inflation fluid then flows rapidly from the inflator 12 into the air bag 14. As the inflation fluid begins to inflate the air bag 14, it moves the air bag 14 outward against the cover 40. The force of the inflation fluid pressure acting on the air bag 14 ruptures the rupturable section 48 of the cover 40 and moves the deployment door panels 44 and 46 pivotally outward, as shown in FIG. 2. As the inflation fluid continues to inflate the air bag 14, it moves the air bag 14 outward from the cover 40 past the deployment door panels 44 and 46.

The air bag 14 has a body 50 and a mouth 52. When the air bag 14 is being inflated from the condition of FIG. 1 to the condition of FIG. 2, the body 50 of the air bag 14 is deployed toward the driver of the vehicle. The mouth 52 of the air bag 14 is retained on the reaction plate 28 with the inflator 12. Specifically, the mouth 52 is an annular edge portion of the air bag 14 which defines a circular opening 53. The inflator housing 22 projects axially into the air bag 14 through the opening 53. A circular plastic retainer ring 54 also is received within the air bag 14, and overlies the mouth 52 of the air bag 14 radially outward of the opening 53. A plurality of fastener assemblies 56, two of which are shown partially in FIGS. 1 and 2, are spaced apart in an array extending circumferentially around the retainer ring 54. The fastener assemblies 56 clamp the mouth 52 of the air bag 14 between the retainer ring 54 and the reaction plate 28. The fastener assemblies 56 also clamp the inflator flange 26 to the reaction plate 28.

Figure 3:
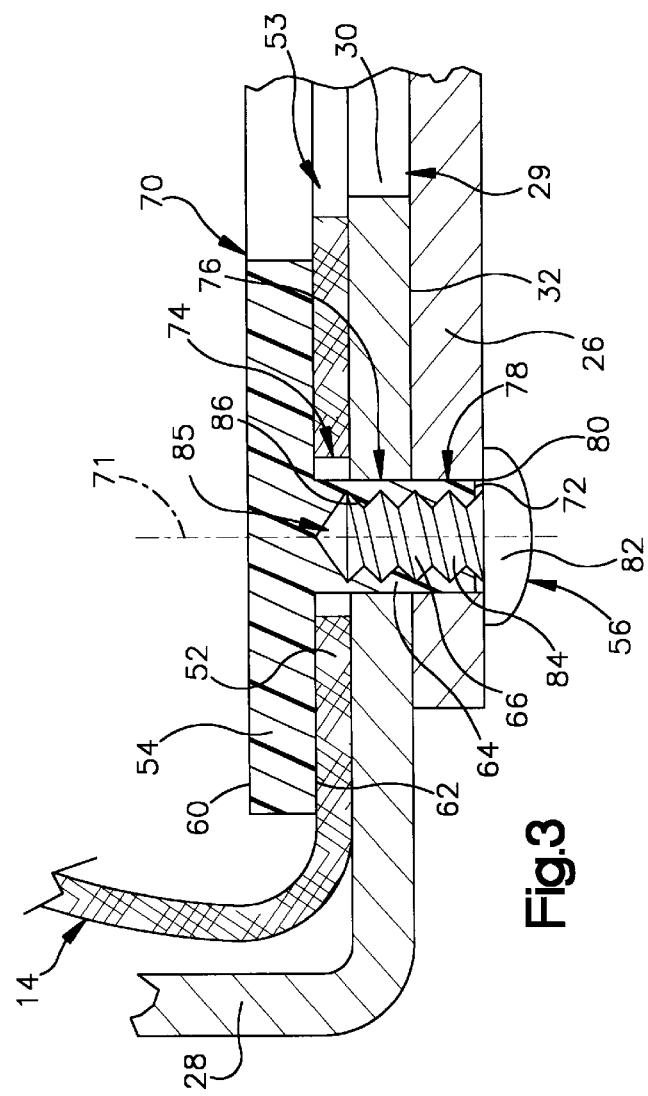
FIG. 3 is an enlarged partial view of parts of the apparatus of FIG. 1.

As shown in FIG. 3, the retainer ring 54 in the first embodiment of the invention has a rectangular radial cross-section with axially opposite sides 60 and 62. Each fastener assembly 56 includes a mounting stud 64 and a screw-threaded fastener 66. The mounting studs 64 project axially from one side 62 of the retainer ring 54. In accordance with a particular feature of the present invention, the mounting studs 64 and the retainer ring 54 are portions of a one-piece plastic retainer structure 70. By "one-piece" it is meant that the retainer structure 70 is a single unit exclusive of separate but joined elements. The fasteners 66 are preferably formed of metal.

Each mounting stud 64 in embodiment is a cylindrical structure with a uniform outer diameter. Each mounting stud 64 thus projects from the retainer ring 54 along a corresponding longitudinal central axis 71, and has a uniform peripheral size and shape fully along its length between the retainer ring 54 and a free end 72 of the mounting stud 64.

In accordance with another particular feature of the invention, each mounting stud 64 projects from the retainer ring 54 fully through a pair of apertures 74 and 76 in the air bag 14 and the reaction plate 28, respectively, but projects only partially through an aligned aperture 78 in the inflator flange 26. Accordingly, the free end 72 of the mounting stud 64 is spaced axially inward from a lower end 80 of the aperture 78 in the inflator flange 26, as viewed in FIG. 3.

The fasteners 66 have heads 82 and shafts 84. The shaft 84 of each fastener 66 is screwed into an axially extending bore 85 defined by a screw-threaded inner surface 86 of the corresponding mounting stud 64. The heads 82 of the fasteners 66 contact and are tightened against the inflator flange 26 in an annular area radially outward of the apertures 78 in the flange 26. When the fasteners 66 are being tightened in this manner, they draw the retainer ring 54 axially toward the reaction plate 28 so as to compress and clamp the mouth 52 of the air bag 14 between the retainer ring 54 and the reaction plate 28. The spacing between the free ends 72 of the mounting studs 64 and the lower ends 80 of the apertures 78 enables a corresponding amount of axial movement of the mounting studs 64 upon tightening of the heads 82 against the flange 26. The metal-to-metal contact of the heads 82 and the flange 26 enables the heads 82 to be screwed tightly and securely against the flange 26.

Figure 4:
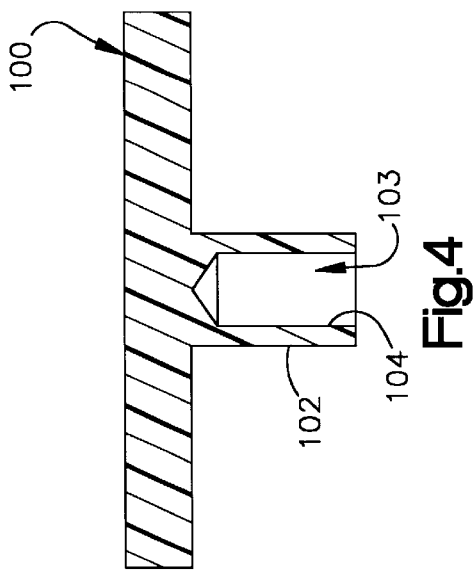
FIG. 4 is a sectional view of a part of a second embodiment of the invention.

A second embodiment of the present invention includes an alternative retainer structure 100 (FIG. 4) in place of the retainer structure 70 described above. The retainer structure 100 has mounting studs 102 with bores 103 defined by smooth cylindrical inner surfaces 104, but is otherwise the same as the retainer structure 70. The mounting studs 102 are thus configured to receive a corresponding plurality of self-tapping, screw-threaded fasteners (not shown). Such fasteners could be the same as the fasteners 66 in the first embodiment, but will engage the mounting studs 102 more tightly upon cutting into the plastic material of the mounting studs 102 at the smooth cylindrical inner surfaces 104.

As shown in FIGS. 5 and 6, a third embodiment of the present invention includes another alternative retainer structure 120. Like the retainer structures 70 and 100, the retainer structure 120 is a one-piece plastic structure including a circular retainer ring 122 and a plurality of circumferentially spaced apart mounting studs 124, one of which is shown in FIGS. 5 and 6. The retainer ring 122 is configured to overlie the mouth 52 of the air bag 14 adjacent to the opening 53 defined by the mouth 52. The mounting studs 124 differ, however, from the mounting studs 64 and 102 described above.

Each mounting stud 124 has a shaft portion 126 and a barbed free end portion 128. The shaft portion 126 projects from the retainer ring 122 fully through the apertures 74, 76, and 78 in the air bag 14, the reaction plate 28, and the inflator flange 26. The barbed free end portion 128 projects radially outward of the aperture 78 in the flange 26.

As shown in FIG. 7, both the shaft portion 126 and the free end portion 128 of the mounting stud 124 have circular peripheral shapes centered on a longitudinal central axis 129. An axially elongated slot 130 bisects the mounting stud 124 diametrically. The mounting stud 124 is thus configured as a split-pin fastener with an opposed pair of half sections 132 on opposite sides of the slot 130. Each half section 132 of the mounting stud 124 includes a barb 134 that projects radially outward. The slot 130 provides clearance for the half sections 132 to be deflected toward one another, i.e., radially inward relative to the apertures 74, 76 and 78, upon receipt of the barbs 134 through the apertures 74, 76 and 78.

The third embodiment further includes a plurality of plastic keys 140, one of which also is shown in FIGS. 5 and 6. A pair of arms 142 on each key 140 are movable longitudinally inward of the slot 130 in a corresponding mounting stud 124. When the arms 142 on a key 140 reach the positions shown in FIG. 7, enlarged end portions 144 of the arms 142 snap into interlocked engagement with the mounting stud 124 in recesses 148 near the axially inner end of the slot 130. The arms 142 are tapered so as to deflect the half sections 132 of the mounting stud 124 radially outward, and thereby to move the barbs 134 into engagement with the flange 26 radially outward of the aperture 78, as shown in FIG. 6. The arms 142 then block the barbs 134 from moving radially inward. The key 140 and the mounting stud 120 are thus snapped together into an interlocked condition in which the key 140 blocks withdrawal of the mounting stud 124 from the apertures 74, 76 and 78.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a retainer ring configured to overlie an edge portion of an inflatable vehicle occupant protection device adjacent to an opening defined by the edge portion of the protection device; and a mounting stud projecting from said retainer ring, said mounting stud having a central axis and a free end spaced from said retainer ring along said axis, said mounting stud further having a uniform peripheral size and shape extending axially from said retainer ring to said free end;

said mounting stud further having an axially extending bore configured to receive a screw-threaded fastener.

2. Apparatus as defined in claim 1 wherein said mounting stud has a screw-threaded inner surface within said bore.

3. Apparatus as defined in claim 1 wherein said mounting stud has a smooth cylindrical inner surface to engage a self-tapping screw-threaded fastener in said bore.

4. Apparatus as defined in claim 1 wherein said retainer ring and said mounting stud are portions of a one-piece plastic structure.

5. Apparatus as defined in claim 1 further comprising a screw-threaded fastener received in said bore.

6. Apparatus as defined in claim 1 wherein said mounting stud is a cylindrical structure with a uniform outer diameter.

7. Apparatus comprising:

an inflatable vehicle occupant protection device;

an inflator and a reaction structure comprising rigid clampable parts;

a retainer ring;

a mounting stud projecting from said retainer ring fully through an aperture in said protection device and partially through an aperture in one of said rigid clampable parts, said mounting stud having an axially extending bore; and a fastener having a shaft received in said bore in said mounting stud and a head tightened against said one of said rigid clampable parts, said fastener securing said inflatable vehicle occupant protection device between said retainer ring and said reaction structure.

8. Apparatus as defined in claim 7 wherein said mounting stud and said retainer ring are portions of a one-piece plastic structure.

9. Apparatus as defined in claim 7 wherein said fastener and said one of said rigid clampable parts are metal.

* * * * *